(12) United States Patent
Doi et al.

(10) Patent No.: US 11,476,048 B2
(45) Date of Patent: Oct. 18, 2022

(54) DIELECTRIC MATERIAL AND MULTILAYER CERAMIC CAPACITOR INCLUDING THE SAME

(71) Applicant: SAMSUNG ELECTRO-MECHANICS CO., LTD., Suwon-si (KR)

(72) Inventors: Toshihiro Doi, Yokohama (JP); Ken Yamaguchi, Yokohama (JP); Kotaro Hata, Yokohama (JP)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/938,149

(22) Filed: Jul. 24, 2020

(65) Prior Publication Data

US 2021/0035737 A1 Feb. 4, 2021

(30) Foreign Application Priority Data

Jul. 29, 2019 (JP) .............................. JP2019-139232
Jul. 14, 2020 (KR) ......................... 10-2020-0086830

(51) Int. Cl.
*C04B 35/468* (2006.01)
*H01G 4/12* (2006.01)
(Continued)

(52) U.S. Cl.
CPC ....... *H01G 4/1209* (2013.01); *C04B 35/4682* (2013.01); *C04B 35/6261* (2013.01); *C04B 35/6264* (2013.01); *C04B 35/62675* (2013.01); *C04B 35/6342* (2013.01); *C04B 35/64* (2013.01); *C04B 2235/3206* (2013.01); *C04B 2235/3224* (2013.01); *C04B 2235/3225* (2013.01); *C04B 2235/3236* (2013.01); *C04B 2235/3239* (2013.01); *C04B 2235/3263* (2013.01); *C04B 2235/3418* (2013.01);
(Continued)

(58) Field of Classification Search
CPC .............. H01G 4/1209; C04B 35/4682; C04B 2235/3206; C04B 2235/3224; C04B 2235/3225; C04B 2235/3236; C04B 2235/3239; C04B 2235/3263; C04B 2235/3418
See application file for complete search history.

(56) References Cited

U.S. PATENT DOCUMENTS 7,821,770 B2 * 10/2010 Nishikawa .......... C04B 35/4682
    361/321.2
9,064,635 B2 *  6/2015 Wang .................... C04B 35/468
(Continued)

FOREIGN PATENT DOCUMENTS

CN    105174941 A    12/2015
JP   2002087879 A *  3/2002 ............. C04B 35/46
(Continued)

OTHER PUBLICATIONS

Japanese Office Action dated Aug. 23, 2022, issued in corresponding Japanese Patent Application No. 2019-139232.

*Primary Examiner* — Noah S Wiese
(74) *Attorney, Agent, or Firm* — Morgan, Lewis & Bockius LLP

(57) ABSTRACT

A dielectric material which satisfies X9M characteristics and ensures operations over an extended period of time at 200° C. is provided.

17 Claims, 1 Drawing Sheet

(51) Int. Cl.
*C04B 35/626* (2006.01)
*C04B 35/634* (2006.01)
*C04B 35/64* (2006.01)

(52) U.S. Cl.
CPC ... *C04B 2235/442* (2013.01); *C04B 2235/6021* (2013.01); *C04B 2235/6567* (2013.01); *C04B 2235/6582* (2013.01)

(56) References Cited

U.S. PATENT DOCUMENTS

| | | |
|---|---|---|
| 2008/0089008 A1 | 4/2008 | Nishikawa et al. |
| 2011/0170228 A1 | 7/2011 | Ikeda |
| 2012/0170169 A1 | 7/2012 | Suzuki et al. |
| 2016/0118188 A1 | 4/2016 | Wada |
| 2017/0186543 A1 | 6/2017 | Park et al. |

FOREIGN PATENT DOCUMENTS

| | | |
|---|---|---|
| JP | 2008-094673 A | 4/2008 |
| JP | 2013-227196 A | 11/2013 |
| JP | 2017-114759 A | 6/2017 |
| JP | 2017-119607 A | 7/2017 |
| WO | 2010/035663 A1 | 4/2010 |
| WO | 2011/036970 A1 | 3/2011 |
| WO | 2015/040869 A1 | 3/2015 |

\* cited by examiner

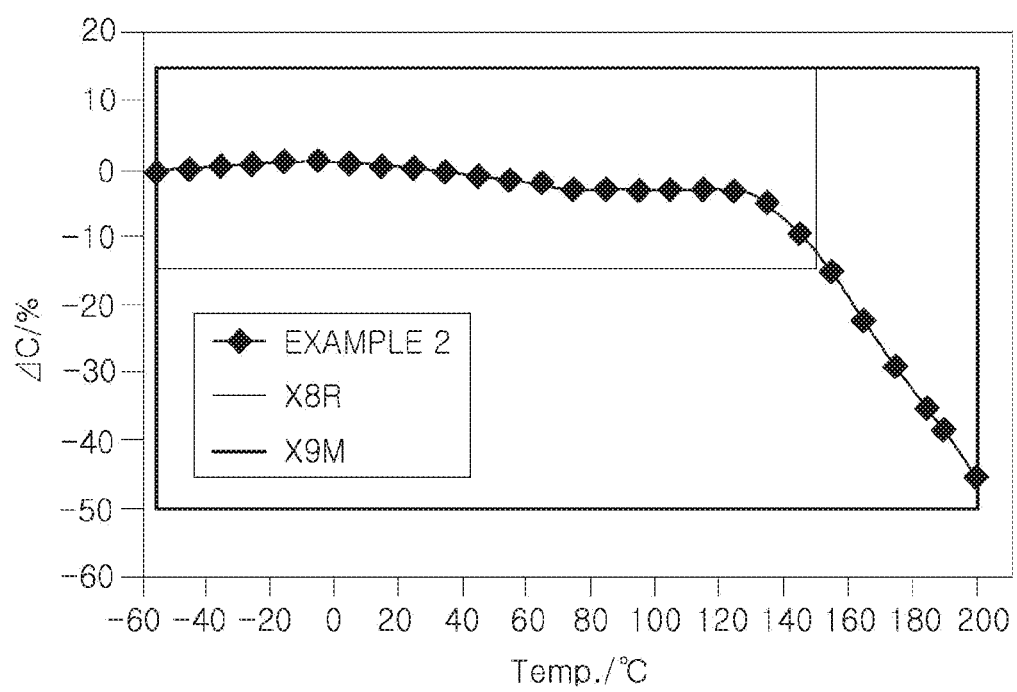

DIELECTRIC MATERIAL AND MULTILAYER CERAMIC CAPACITOR INCLUDING THE SAME

CROSS-REFERENCE TO RELATED APPLICATION

This application claims benefit of priorities to Japanese Patent Application No. 2019-139232 filed on Jul. 29, 2019 and Korean Patent Application No. 10-2020-0086830 filed on Jul. 14, 2020 in the Korean Intellectual Property Office, the disclosures of which are incorporated herein by reference in their entirety.

TECHNICAL FIELD

The present disclosure relates to a dielectric material and a multilayer ceramic capacitor.

BACKGROUND

Demand for performance and reliability of electronic components has increased in line with the evolution of electronic control of automobiles. For example, electronic components used in power modules of electric vehicles require reliability under high temperature conditions. For example, ceramic capacitors are required to have capacitive characteristics (i.e., X8R characteristics, etc.) against temperature changes.

SUMMARY

However, barium titanate has a Curie temperature, at which ferroelectric properties are lost, as low as 130° C. Accordingly, a dielectric constant gradually decreases when a temperature exceeds 130° C. In addition, a temperature capacity change rate ΔC also deteriorates rapidly. Thus, it is difficult for capacitors manufactured using barium titanate to satisfy X9M characteristics, while maintaining high capacity. Meanwhile, X9M characteristics refer to the characteristics that the temperature capacity change rate ΔC ranges from −50% to +15% at temperatures from −55° C. to 200° C.

An aspect of the present disclosure may provide a dielectric material that satisfies X9M characteristics and ensures long-term operations at 200° C.

According to an aspect of the present disclosure, a dielectric material may include x molar parts of Ba, c molar parts of Si, d molar parts of Mg, e molar parts of Mn, f molar parts of V, and g molar parts of rare earth element Re (Re contains at least Y), wherein x=100(1−a)+b, $0.05 < a < 0.15$, $1.0 < b < 2.5$, $0.5 < c < 5.0$, $1.0 < d < 4.0$, $0.01 < e < 1.0$, $0.01 < f < 3.0$, and $5.0 < g \leq 7.0$.

Meanwhile, the above summary of the present disclosure does not list all necessary features of the disclosure. In addition, subcombinations of feature groups thereof may also be a disclosure.

BRIEF DESCRIPTION OF DRAWINGS

The above and other aspects, features and other advantages of the present disclosure will be more clearly understood from the following detailed description taken in conjunction with the accompanying drawings, in which:

FIG. 1 is a view illustrating a TCC curve of a dielectric material manufactured in Example 2.

DETAILED DESCRIPTION

Exemplary embodiments in the present disclosure will now be described in detail with reference to the accompanying drawings.

[1] Composition of Dielectric Material

A composition of a dielectric material according to the present exemplary embodiment will be described. The dielectric material according to the present disclosure may be formed by sintering components (A) to (G) to be described later.

In the present exemplary embodiment, the dielectric material includes the following components (A) to (G).

Component (A): $(Ba_{1-a}Ca_a)TiO_3$
Component (B): BaO
Component (C): $SiO_2$
Component (D): MgO
Component (E): MnO
Component (F): $VO_{5/2}$
Component (G): $ReO_{3/2}$ (Re includes at least Y.)

A mixing amount of component (B) to component (G) with respect to 100 moles of component (A) may be b mole to g mole. In this exemplary embodiment, a to g satisfy the following conditions.

$0.05 < a < 0.15$, $1.0 < b < 2.5$, $0.5 < c < 5.0$, $1.0 < d < 4.0$, $0.01 < e < 1.0$, $0.01 < f < 3.0$, $5.0 < g \leq 7.0$ (1) Barium Calcium Titanate: $(Ba_{1-a}Ca_a)TiO_3$ A dielectric material of the present exemplary embodiment is ceramics containing barium calcium titanate as a main component. The term of "main component" refers to a component having a largest proportion of moles among components constituting the dielectric material. Here, a trace amount of impurities inevitably contained in terms of manufacturing may be contained in the dielectric material. The impurity component may include a metal-derived component, such as sodium, calcium, niobium, iron, lead, and chromium, for example. In addition, a hydrocarbon-based organic component, absorbed water, and the like may be included as impurities.

Barium calcium titanate is a compound represented by $(Ba_{1-a}Ca_a)TiO_3$. Barium titanate (a=0), which has been known, has a high relative dielectric constant. However, since ferroelectricity of barium titanate is lost at about 130° C. or higher, permittivity decreases. As a result, a temperature change rate (X9M) of an electric capacity required for guaranteeing 200° C. cannot be secured. Therefore, barium titanate cannot be used as a material for a multilayer chip as it is. Barium calcium titanate is a compound in which a part of a Ba atom of barium titanate is replaced with a Ca atom. Barium calcium titanate has good characteristics of a temperature change rate of an electric capacity even at 200° C.

Here, "a", which represents a Ca content ratio of barium calcium titanate, satisfies $0.05 < a < 0.15$. When this range is satisfied, the X9M characteristic is improved and a relative dielectric constant is increased. Preferably, "a" satisfies a range from 0.06 to 0.10. More preferably, "a" ranges from 0.07 to 0.10. The Ca content ratio "a" and Ba content ratio "1-a" are determined by XRF measurement or ICP measurement. More specifically, a value obtained by a method (measurement conditions) described in Examples is adopted as "a".

(2) Barium Component: BaO

The dielectric material of this exemplary embodiment includes BaO. BaO is mainly added as a sintering aid. The content of "b" of BaO satisfies $1.0 < b < 2.5$. When this range is satisfied, sinterability of the dielectric material is improved. Further, when this range is satisfied, a dielectric material having excellent dielectric constant and insulation properties is obtained. b is particularly preferably 1.5. In one example, b is approximately 1.5. The term, "approximately," may refer to a case in which a process error or a measurement error recognizable by one of ordinary skill in the art is considered. Meanwhile, the content of BaO is controlled from the amount of a barium compound used in the production of the dielectric material. As the barium compound, for example, $BaCO_3$ or the like may be used instead of at least a part of BaO.

Therefore, the total content of barium (Ba) may refer to the sum of components (1) and (2). The total content "x" of barium (Ba) may satisfy a relationship of $x=100(1-a)+b$. Here, the content x of barium (Ba) may be within a range of 81.132 at % or more, 81.982 at % or more, or 83.536 at % or more, 93.732 at % or less, 93.671 at % or less, 93.610 at % or less, or 93.212 at % or less based on the entire dielectric material.

(3) Silicon Component: $SiO_2$

The dielectric material of this exemplary embodiment includes $SiO_2$. $SiO_2$ is mainly added as a sintering aid. The content "c" of $SiO_2$ satisfies $0.5<c<5.0$. When c exceeds 0.5, it is possible to sinter the dielectric material under low temperature conditions of 1300° C. or lower. Accordingly, excellent capacity temperature characteristics and insulation resistance of barium calcium titanate are not impaired. In addition, applicability to ceramic electronic components such as capacitors is excellent.

If c is less than 5.0, good sinterability, good relative dielectric constant, and high temperature load life may be achieved. c preferably satisfies $1.5<c<5.0$. c is particularly preferably 2.0. In one example, c is approximately 2.0. Meanwhile, the content of $SiO_2$ is controlled from the amount of silicon compound used in the production of the dielectric material. As the silicon compound, for example, an inorganic glass-based compound or the like may be used instead of at least a part of $SiO_2$.

Meanwhile, when the content c of Si satisfies $0.5<c<5.0$, it may be within a range of 0.442 at % or more and 5.154 at % or less based on the entire dielectric material. In addition, when the content c of Si satisfies $1.5<c<5.0$, it may be within a range of 0.905 at % or more and 5.149 at % or less based on the entire dielectric material.

(4) Magnesium Component: MgO

The dielectric material of this exemplary embodiment includes MgO. MgO is mainly added for the purpose of improving reliability of a sintered body. The content "d" of MgO satisfies $1.0<d<4.0$. When d exceeds 1.0, MgO is interposed between particles of the barium calcium titanate powder. Accordingly, an effect of suppressing deterioration in electrical insulation when a high voltage is applied at high temperatures is obtained. In addition, reliability is improved. Meanwhile, if d is less than 4.0, it is possible to sinter the dielectric material at 1300° C. or lower. Meanwhile, the content of MgO is controlled from the amount of a magnesium compound used in the production of the corresponding dielectric material. As the magnesium compound, for example, $MgCO_3$ or the like may be used instead of at least a part of MgO.

Meanwhile, when the content d of Mg satisfies $1.0<d<4.0$, it may be within a range of 0.873 at % or more and 4.188 at % or less based on the entire dielectric material or may be within a range of 0.897 at % or more and 4.162 at % or less, but is not particularly limited.

(5) Manganese Component: MnO

The dielectric material of this exemplary embodiment includes MnO. MnO is mainly added as a non-reducible aid. The content "e" of MnO satisfies $0.01<e<1.0$. When e exceeds 0.01, it is possible to effectively suppress oxygen vacancy that occurs in a sintering process under a reducing atmosphere. As a result, reliability of a ceramic electronic component including the dielectric material is improved. Meanwhile, an oxygen defect is formed in a crystal structure of barium calcium titanate. Meanwhile, if e is less than 1.0, the relative dielectric constant is improved.

The content e satisfies $0.05<e<0.7$. The content e preferably satisfies $0.05<e<0.25$. Accordingly, the relative dielectric constant of the dielectric material is further improved. The content e is particularly preferably 0.15. In one example, e is approximately 0.15. Meanwhile, the content of MnO is controlled from the amount of the manganese compound used in the production of the dielectric material. As the manganese compound, for example, $MnO_2$, $Mn_2O_3$, $Mn_3O_4$, or the like may be used instead of at least a part of MnO.

Meanwhile, when the content e of Mn satisfies $0.01<e<1.0$, it may be within a range of 0.009 at % or more and 1.069 at % or less based on the entire dielectric material. In addition, when the content e of Mn satisfies $0.05<e<0.7$, it may be within a range of 0.044 at % or more and 0.747 at % or less based on the entire dielectric material. When the content e of Mn satisfies $0.05<e<0.25$, it may be within a range of 0.044 at % or more and 0.268 at % or less based on the entire dielectric material.

(6) Vanadium Component: $VO_{5/2}$

The dielectric material of this exemplary embodiment includes $VO_{5/2}$. $VO_{5/2}$ serves as a sintering aid. Also, $VO_{5/2}$ is added to improve the reliability of the dielectric material. The content "f" of $VO_{5/2}$ satisfies $0.01<f<3.0$. Within this range, excellent capacity temperature characteristics and relative dielectric constant may be obtained. Moreover, within this range, excellent applicability to ceramic electronic components such as a capacitor may be obtained.

In order to densely sinter barium calcium titanate without a sintering aid, a high temperature of 1500° C. or higher is required. In order to be applied to ceramic electronic components such as capacitors, co-sintering with a metal electrode is essential. Accordingly, it is necessary to realize sintering at a low temperature of 1300° C. or lower. By controlling the range of "f" as described above, sinterability is improved. In addition, it is possible to suppress insulation deterioration of ceramics. Thus, the dielectric material of the present exemplary embodiment may be produced by sintering at about 1300° C. or lower.

$VO_{5/2}$ associates with formed oxygen vacancies under high temperature and high electric field. As a result, movement of oxygen vacancies, which is a cause of deterioration of insulation, is suppressed, and insulating properties of the ceramics may be maintained even under the high temperature and high electric field. If f is 0.01 or less, an inhibitory effect on the movement of oxygen vacancies under the high electric field is insufficient. Thus, deterioration of electrical insulation when a high voltage is applied for a long time at a high temperature cannot be suppressed. Meanwhile, if f is 3.0 or more, the dielectric constant of the dielectric material is lowered. In addition, the capacity temperature characteristic of the dielectric material at 200° C. is also lowered. Accordingly, the X9M characteristic cannot be satisfied.

The content f preferably satisfies $0.05<f<0.7$. f is particularly preferably 0.4. In one example, f is approximately 0.4. By setting f to a more preferable range, sinterability of the dielectric material can be improved. In addition, the capacitance temperature characteristic of the dielectric material can be improved and the relative dielectric constant may be increased. Meanwhile, the content of $VO_{5/2}$ is controlled from the amount of the vanadium compound used in the production of the corresponding dielectric material. As the vanadium compound, for example, $NH_4VO_3$, $VOCl_3$, or the like may be used instead of at least a part of $VO_{5/2}$.

Meanwhile, if the content f of V satisfies $0.01<f<3.0$, it may be within a range of 0.009 at % or more and 3.141 at % or less based on the entire dielectric material. In addition, when the content f of V satisfies $0.05<e<0.7$, it may be within a range of 0.044 at % or more and 0.747 at % or less based on the entire dielectric material.

(7) Rare Earth Components: YO, DyO, Other Rare Earth Elements

The dielectric material of the present exemplary embodiment includes a rare earth element (Re). The rare earth element Re is mainly added for the purpose of improving an average failure time of a high temperature life load test. Examples of the rare earth element Re include Y, Dy, Yb, Ho, Gd, and Tb. The rare earth element contained in the dielectric material may be one type or two or more types. However, Re includes at least Y. Preferably, Re includes one or more elements selected from among Y and rare earth elements other than Y. One or more elements selected from the rare earth elements other than Y is particularly preferably Dy.

The content "g" of ReO satisfies $5.0<g\leq7.0$. If g exceeds 5.0, an average breakdown time is improved. As a result, reliability of the ceramic electronic component including the dielectric material is improved. Meanwhile, if g is 7.0 or less, both high relative dielectric constant and high reliability may be achieved. Furthermore, when g is in the above range, the relative dielectric constant is improved. g is preferably 5.5. In one example, g is approximately 5.5.

Meanwhile, when the content g of Re satisfies $5.0<g\leq7.0$, it may be within a range of 4.329 at % or more or 4.446 at % or more and 7.406 at % or less or 7.361 at % or less based on the entire dielectric material.

When Re includes Y and rare earth elements other than Y, "g" is defined as follows.

$$g=g1+g2$$

(g1: mole number of Y, g2: mole number of one or more elements selected from rare earth elements other than Y)

In the present exemplary embodiment, preferably, $g1\geq4$ and $g2\geq1$.

(8) Other Sub-Components

The dielectric material of the present exemplary embodiment may include, as sub-components, components other than the above components. Examples of such sub-components may include aluminum compounds, calcium compounds, zirconia and barium compounds. As a more specific compound, for example, aluminum oxide ($Al_2O_3$), calcium carbonate ($CaCO_3$), calcium titanate ($CaTiO_3$), or a compound thereof, and other sintering aids or nonreducible aids such as zirconia or barium oxides (ZrO, $BaZrO_3$).

The dielectric material of the present exemplary embodiment may not include a Cr component, for example, $CrO_{3/2}$ or the like or may include a trace if any. The content of $CrO_{3/2}$ is preferably less than 0.01 mol with respect to 100 mol of $(Ba_{1-a}Ca_a)TiO_3$. This may mean that Cr is contained in an amount of less than 0.01 mol with respect to 100 mol of Ti. If the content of Cr is 0.01 mol or more, it may not be possible to secure the electrical insulating properties required as a multilayer capacitor.

[2] Form and Characteristics of Dielectric Material

The form of the dielectric material of the present exemplary embodiment is not particularly limited. The dielectric material may take the form of a spherical object, a plate-like object, or a pellet. In addition, it is also possible to take a composite form by combining these forms.

The dielectric material of this exemplary embodiment is excellent in capacity temperature characteristics. Specifically, the dielectric material exhibits a low capacity temperature change rate in a range from −55° C. to 200° C. The capacity temperature change rate (ΔC) is defined by the following equation.

Capacity temperature change rate (ΔC)=[{(capacitance at target temperature)−(capacitance at 25° C.)}/(capacitance at 25° C.)]×100(%) [Equation 1]

The capacity temperature change rate (ΔC) at −55° C. or higher and 150° C. or lower is preferably within ±22%, and more preferably, within ±15% (X8R).

The capacity temperature change rate (ΔC) within a range from −55° C. to 200° C. is preferably within a range from −50% to +15% (X9M). Meanwhile, in the above equation, the capacitance at each temperature may be measured by the method described in Examples.

The dielectric material satisfying the requirements of a to g meets at least the requirements of X9M. Accordingly, a problem of a rapid reduction of ΔC under high temperature conditions (e.g., 200° C.) may be solved. Preferably, the dielectric material meets the requirements of X9M and X8R. When both requirements are met, the problem of rapid reduction of AC in a wider temperature range may be solved.

The dielectric material of this exemplary embodiment preferably exhibits a high relative dielectric constant. The relative dielectric constant is preferably 2000 or more, and more preferably 2300 or more. Meanwhile, an upper limit of the relative dielectric constant is not particularly limited but substantially 5000 or less. Meanwhile, the relative dielectric constant may be measured by the method described in Examples.

[3] Method of Manufacturing Dielectric Material

The dielectric material of the present exemplary embodiment is produced, for example, by the following steps (1) to (3). However, the method for manufacturing a dielectric material of the present exemplary embodiment is not limited thereto.

(1) A step of mixing at least barium calcium titanate, BaO, $SiO_2$, MgO, MnO, $VO_{5/2}$, and $ReO_{3/2}$.

(2) A step of shaping a mixture obtained in step (1) to obtain a shaped body.

(3) A step of sintering the shaped body obtained in step (2) at a temperature of 1300° C. or lower.

Hereinafter, each step will be described in detail.

(1) Mixing step

Barium calcium titanate (main component) is mixed with sub-components such as BaO. Also, a mixture (slurry) for manufacturing a shaped body (green sheet) is prepared.

Barium calcium titanate may be commercially available. Further, barium calcium titanate may be produced by a solid phase method. Instead of the solid phase method, an oxalate method, a hydrothermal synthesis method, an alkoxide method, a sol-gel method, or the like may be used.

An average particle diameter of barium calcium titanate is not particularly limited. Preferably, the average particle diameter ranges from 50 nm to 500 nm. More preferably, the average particle diameter is 300 nm or less. Meanwhile, as the average particle diameter of each particle, a value measured by the method of Examples is adopted.

The sub-component used for the production of the dielectric material is not particularly limited. The compounds exemplified in the description of each component are appropriately used. In addition, compounds to be used are selected from the viewpoints of availability, ease of handling, and suppression of mixing of impurities. Preferably, a silicon oxide ($SiO_2$, etc.), a barium oxide (BaO, etc.), a barium carbonate ($BaCO_3$), a manganese oxide ($MnO_2$, $Mn_2O_3$, $Mn_3O_4$, etc.) are used. Meanwhile, commercially available products or synthetic products may be used as the sub-components (raw materials for the sub-components).

A vanadium compound added as a sub-component is not particularly limited. For example, the vanadium compound may include $V_2O_5$, $NH_4VO_3$, $VOCl_3$, $NaVO_3$, $KVO_3$, $Na_3VO_4$, $VCl_4$, $VOSO_4$, $VOCl_2$, $VO_2$, $VCl_3$, $V_2O_3$, $V_6O_{13}$, and the like. A vanadium oxide is preferably added as the vanadium compound from the availability and suppression of contamination of other components. The vanadium oxide is preferably $V_2O_5$, $VO_2$ and $V_2O_3$. Meanwhile, the vanadium compound may be used alone or in combination of two or more thereof.

An average particle diameter of the vanadium compound in use is not particularly limited. Preferably, an average particle diameter is all 1000 nm or less. More preferably, the average particle diameter ranges from 50 nm to 500 nm. Meanwhile, as the average particle diameter of each particle, a value measured by the method of Examples is adopted.

An added amount of the raw material of the sub-component such as BaO may be calculated from the content of each component described above. Moreover, the added amount may be a preferred content of each component. Accordingly, detailed descriptions are provided here.

Step (1) may be performed by the following method as an example. A slurry is produced by wet-mixing the components of the dielectric material of the present exemplary embodiment in a solvent. Meanwhile, additives such as a binder, a plasticizer, and a dispersant may be mixed with the slurry. Further, other additives such as a lubricant, an antistatic agent, and the like may be added to the slurry.

The solvent used for wet mixing is not particularly limited. For example, water, an alcohol-based solvent, a glycol-based solvent, a ketone-based solvent, an ester-based solvent, an ether-based solvent, an aromatic solvent, or a combination of two or more thereof may be used. Examples of the alcohol-based solvent may include ethanol, methanol, benzyl alcohol, and methoxyethanol. Examples of the glycol-based solvent may include ethylene glycol and diethylene glycol. Examples of the ketone-based solvent may include acetone, methyl ethyl ketone, methyl isobutyl ketone, and cyclohexanone. Examples of the ester-based solvent may include butyl acetate, ethyl acetate, carbitol acetate, and butyl carbitol acetate. Examples of the ether-based solvent include methyl cellosolve, ethyl cellosolve, butyl ether, and tetrahydrofuran. Examples of the aromatic solvent may include benzene, toluene, xylene, etc. Thereamong, the alcohol-based solvent and the aromatic solvents are preferred. These solvents have good solubility and dispersibility of various additives contained in the slurry. The alcohol-based solvent is preferably a low boiling point solvent such as methanol or ethanol. Moreover, the aromatic solvent is preferably a low boiling point solvent such as toluene. The solvent may be used alone or in combination of two or more in a certain proportion. When mixing two or more solvents, preferably, the alcohol-based solvent and the aromatic solvent are mixed.

A usage amount of the solvent is preferably 0.5 times or more and 10 times or less of a total mass of the main component and the sub-component (raw material of the sub-component). The usage amount of the solvent is more preferably 0.7 times or more and 5 times or less. Within the range, the main component, the sub-component (raw material of a sub-component), an additive, and the like may be fully mixed. Furthermore, an operation of removing the solvent later may be easily performed.

A binder that may be included in the slurry is not particularly limited. Examples of the binder may include polyvinyl alcohol (PVA), polyvinyl butyral (PVB), acrylic resin, and the like. In addition, the binder may be used alone or in a combination of two or more types.

A usage amount of the binder is not particularly limited. Preferably, the binder is 0.01% by mass or more and 20% by mass or less with respect to the total mass of the main component and the sub-component. More preferably, the binder is 0.5% by mass or more and 15% by mass or less. Within this range, a density of the shaped body is improved.

A plasticizer that may be included in the slurry is not particularly limited. For example, the plasticizer may include a phthalic acid plasticizer such as dioctyl phthalate (DOP), benzylbutyl phthalate, dibutyl phthalate, dihexyl phthalate, di(2-ethylhexyl) phthalate (DEHP) and di(2-ethylbutyl) phthalate, and the like, an adipic acid-based plasticizer such as dihexyl adipate and di(2-ethylhexyl) adipate (DOA), and the like, a glycol-based plasticizer such as ethylene glycol, diethylene glycol, and triethylene glycol, and the like, and a glycol ester-based plasticizer such as triethylene glycol dibutyrate, triethylene glycol di(2-ethyl butyrate), triethyleneglycoldi (2-ethylhexanoate), and the like. Thereamong, a phthalic acid-based plasticizer such as dioctyl phthalate, dibutyl phthalate and di(2-ethylhexyl) phthalate are preferred. The use of the phthalic acid-based plasticizer improves flexibility of a green sheet produced from the slurry. In addition, the plasticizer may be used alone or in a combination of 2 or more types.

A usage amount of the plasticizer used is not particularly limited. Preferably, the plasticizer is 5% by mass or more and 50% by mass or less with respect to the total mass of the binder to be added. More preferably, the plasticizer is 10% by mass or more and 50% by mass or less. Particularly preferably, the plasticizer is 15% by mass or more and 30% by mass or less. Within the range, sufficient effect as a plasticizer is obtained.

A dispersant that may be included in the slurry is not particularly limited. For example, the dispersant may be a phosphoric acid ester-based dispersant, polycarboxylic acid-based dispersant, and the like. Thereamong, the phosphoric acid ester-based dispersant is preferred. Meanwhile, the dispersant may be used alone or in combination of two or more thereof.

A usage amount of dispersant is not particularly limited. Preferably, the dispersant is 0.1% by mass or more and 5% by mass or less with respect to the total mass of the main component and the sub-component. More preferably, the dispersant is 0.3% by mass or more and 3% by mass or less. More preferably, the dispersant is 0.5% by mass or more and 1.5% by mass or less. Within the range, a sufficient effect as a dispersant is obtained.

As a method of wet mixing, a wet ball mill, a stirring mill, or a bead mill may be used. The wet ball mill may be a plurality of zirconia balls having a diameter of 0.1 mm or more and 10 mm or less. A mixing time of the wet mixing may be, for example, 8 hours or more and 48 hours or less. Preferably, the mixing time is 10 hours or more and 24 hours or less.

(2) Step of Obtaining Shaped Body

In step (2), a known method may be used and is not particularly limited. Step (2) may be performed by the following method. First, the slurry obtained in step (1) is shaped into a sheet having a predetermined size and shape. For example, the slurry is shaped into a sheet by a doctor blade method or a die coater method. Thereafter, the obtained sheet is stacked and heat-pressed. If necessary, the shaped sheet may be cut into a desired shape such as a chip shape or the like. A so-called green sheet is shaped by step (2).

A thickness of the green sheet (thickness after drying) is not particularly limited. Preferably, the thickness of the green sheet is 30 µm or less. More preferably, the thickness of the green sheet is 20 µm or less. Meanwhile, a lower limit of the thickness of the green sheet (thickness after drying) is not particularly limited. The thickness of the green sheet is substantially 0.5 µm or more.

The green sheet may be stacked until a desired thickness is obtained, and then heat-pressed. In addition, conditions at the time of heat compression are not particularly limited. Preferably, the temperature at the time of heat compression is 50° C. or higher and 150° C. or lower. Preferably, pressure at the time of heat compression is 10 MPa or more and 200 MPa or less. Preferably, a compression time is 1 minute or more and 30 minutes or less. A method of heat compression may include a warm isostatic pressing method (WIP) or the like.

Thereafter, a laminate of the green sheets is cut. Accordingly, a green chip having a desired chip shape may be manufactured.

A binder component or the like contained in the obtained green sheet (or green chip) is preferably removed by thermal decomposition (degreasing treatment). Conditions for the degreasing treatment depend on a type of the binder in use, but are not particularly limited. Preferably, the degreasing treatment is performed at 180° C. or higher and 450° C. or lower. In addition, a degreasing treatment time is not particularly limited. Preferably, the degreasing treatment time is 0.5 hours or more and 24 hours or less. The degreasing treatment is performed in the air or in an inert gas such as nitrogen or argon. Preferably, the degreasing treatment is performed in the air from the point of simplicity of a process control.

(3) Sintering Process

Step (3) is performed by the following method as an example. The shaped body, which has undergone de-binding, is subjected to sintering. A temperature of the sintering may be 1300° C. or lower. A lower limit of the temperature of the sintering is not particularly limited. Preferably, the lower limit is 1000° C. or higher. More preferably, the lower limit is 1150° C. or higher. A range of the temperature of the sintering is more preferably from 1200° C. to 1300° C. Particularly preferably, the temperature range is from 1230° C. to 1260° C. A sintering top keep time is not particularly limited but may be 1 hour or more and 5 hours or less. Preferably, the sintering top keep time is 1 hour or more and 3 hours or less. A temperature rising condition may be 50° C./h or more and 500° C./h or less. Preferably, the temperature rise condition is 100° C./h or more and 300° C./h or less. The sintering atmosphere is not particularly limited. The sintering atmosphere may be an inert gas atmosphere or a reducing atmosphere. The reducing atmosphere may be a mixture of hydrogen and/or water vapor and the like in an inert gas.

[4] Application Target of Dielectric Material

The dielectric material of the present exemplary embodiment may be used in various electronic components. In particular, the dielectric material is appropriately used in electronic parts that require reliability under high temperature (e.g., 150° C. or higher). An example of an electronic component may be a capacitor including a dielectric material. Another example may be a multilayer ceramic capacitor (MLCC) including a dielectric material.

These electronic components are used, for example, in an engine room of an electric vehicle. In addition, the electronic component realizes high performance and reliability. The MLCC containing the dielectric material may be manufactured by the following method, for example.

First, a conductive paste for internal electrodes is printed on the green sheet obtained in step [2] (2). The printing method may be screen-printing, for example. Moreover, Cu, Ni, Pt, Pd, Ag, or the like are used as the conductive paste for internal electrodes. A laminate is formed by stacking a plurality of green sheets with the conductive paste for internal electrodes printed thereon.

Subsequently, the laminate is sandwiched with a green sheet on which the conductive paste for internal electrodes is not printed. Thereafter, the corresponding laminate is compressed. Thereafter, the laminate is cut as needed to form a green chip. Thereafter, the green chip is debound and fired to obtain a condenser chip body. Sintering conditions may be the same as in step [2] (3). Meanwhile, when sintering under a reducing atmosphere, the obtained capacitor chip body may be further annealed. This enables re-oxidation of a dielectric layer.

Next, each end surface of an internal electrode exposed from an end surface of the capacitor chip body is connected to an external electrode. For example, the external electrode may be formed by applying a conductive paste for external electrodes to the end surface. As the conductive paste for external electrodes, those examples of the conductive paste material for internal electrodes may be used. Alternatively, alloys such as Cu, Ag, Ag—Pd, Ag coat Cu and/or carbon materials such as graphite may be used as the same paste. If necessary, a coating layer may be formed on the capacitor chip body by plating.

An example of the electronic component may be a multilayer ceramic capacitor. However, the electronic component according to the present exemplary embodiment is not limited thereto. For example, the electronic component may be various other components, such as a high-frequency module, an electronic component for thermistors, or a composite component thereof.

[5] Example

Examples of the present disclosure and Comparative Examples will be described using tables. However, the technical scope of the present disclosure is not limited to the following examples.

[Raw Materials]

In Examples, Comparative Examples and Reference Examples, the following were used as raw materials.

$(Ba_{(1-a)}Ca_a) TiO_3$: barium calcium titanate (synthesized by solid phase method, average particle diameter of 300 nm)

BaCO$_3$: BW-KH30 (Sakai Chemical Industry Co., Ltd.)
SiO$_2$: AELOSIL OX50 (Nippon Aerosil Co., Ltd.)
MgO: 500A (Ube Material Industries, Ltd.)
Mn$_3$O$_4$: Nano Tek (CI Hwasung Co., Ltd.)
VO$_{5/2}$: vanadium oxide (Taiyo Nippon Sanso Co., Ltd., average particle diameter of 250 nm)
Y$_2$O$_3$: Yttrium acid (Shin-Etsu Chemical Co., Ltd., average particle size of 200 nm)
Dy$_2$O$_3$: Dysprosium oxide (Shin-Etsu Chemical Co., Ltd., average particle diameter of 200 nm)
Yb$_2$O$_3$: Ytterbium oxide (Shin-Etsu Chemical Co., Ltd.)
Ho$_2$O$_3$: Holmium oxide (Shin-Etsu Chemical Co., Ltd.)
Gd$_2$O$_3$: gadolinium oxide (Shin-Etsu Chemical Co., Ltd.)
Tb$_2$O$_3$: terbium oxide (Shin-Etsu Chemical Co., Ltd.)
Barium calcium titanate was prepared using the following raw materials.
TiO$_2$: Super Titania (registered trademark): (F-2, Showa Denko Co., Ltd.)
CaCO$_3$: calcium carbonate (Ube Industries, Ltd.)
BaCO$_3$: BW-KH30 (manufactured by Sakai Chemical Industry Co., Ltd.)
In barium calcium titanate, a moles of Ca atoms were substituted with respect to 1 mole of Ba atoms occupying an A site of a perovskite structure of barium titanate (BaTiO$_3$). Barium calcium titanate was obtained by weighing raw materials, mixing the raw materials, and heat-treating (plasticizing) the mixture. Here, the raw materials included (1-a) mol of barium carbonate, a mol of CaCO$_3$, and 1 mol of titanium oxide. Further, the raw materials were mixed in an aqueous medium using a wet ball mill. Further, the mixed, dried, and coarsely pulverized raw materials were heat-treated (plasticized) at 1000° C. for 3 hours.

Examples 1 to 31, Comparative Examples 1 to 11

The raw materials to be used were weighed by electronic balance so as to obtain a composition ratio of any one of Tables 1 to 7 below. Meanwhile, in Tables 1 to 7, the amounts (moles) of SiO$_2$, BaO, MnO, and VO$_{5/2}$ are respectively molar amounts with respect to 100 moles of barium calcium titanate. In addition, added amounts of SiO$_2$, BaCO$_3$, Mn$_3$O$_4$ and V$_2$O$_5$ were measured, respectively, to obtain the ratio of SiO$_2$, BaO, MnO and VO$_{5/2}$ in Table 1 below.

TABLE 1

|  | Ca a | BaO b | SiO$_2$ c | MgO d | MnO e | VO$_{5/2}$ f | YO $g_1$ | Re$_{(2nd)}$O $g_2$ | ReO g |
|---|---|---|---|---|---|---|---|---|---|
| Example 1 | 0.06 | 1.5 | 2.0 | 2.5 | 0.15 | 0.4 | 4.0 | 1.5 (note 1) | 5.5 |
| Example 2 | 0.07 | 1.5 | 2.0 | 2.5 | 0.15 | 0.4 | 4.0 | 1.5 (note 1) | 5.5 |
| Example 3 | 0.10 | 1.5 | 2.0 | 2.5 | 0.15 | 0.4 | 4.0 | 1.5 (note 1) | 5.5 |
| Example 4 | 0.10 | 1.5 | 2.0 | 2.5 | 0.15 | 0.4 | 5.2 | 0 | 5.2 |
| Example 5 | 0.10 | 1.5 | 2.0 | 2.5 | 0.15 | 0.4 | 4.2 | 1.0 (note 1) | 5.2 |
| Example 6 | 0.10 | 1.5 | 2.0 | 2.5 | 0.15 | 0.4 | 4.0 | 2.0 (note 1) | 6.0 |
| Example 7 | 0.14 | 1.5 | 2.0 | 2.5 | 0.15 | 0.4 | 4.0 | 1.5 (note 1) | 5.5 |
| Comparative Example 1 | 0.04 | 1.5 | 2.0 | 2.5 | 0.15 | 0.4 | 4.0 | 1.5 (note 1) | 5.5 |
| Comparative Example 2 | 0.17 | 1.5 | 2.0 | 2.5 | 0.15 | 0.4 | 4.0 | 1.5 (note 1) | 5.5 |

(note 1)
Re$_{(2nd)}$O = DyO

TABLE 2

|  | Ca a | BaO b | SiO$_2$ c | MgO d | MnO e | VO$_{5/2}$ f | YO $g_1$ | Re$_{(2nd)}$O $g_2$ | ReO g |
|---|---|---|---|---|---|---|---|---|---|
| Example 8 | 0.07 | 1.1 | 2.0 | 2.5 | 0.15 | 0.4 | 4.0 | 1.5 (note 1) | 5.5 |
| Comparative Example 3 | 0.07 | 0.5 | 2.0 | 2.5 | 0.15 | 0.4 | 4.0 | 1.5 (note 1) | 5.5 |
| Comparative Example 4 | 0.07 | 3.0 | 2.0 | 2.5 | 0.15 | 0.4 | 4.0 | 1.5 (note 1) | 5.5 |

(note 1)
Re$_{(2nd)}$O = DyO

TABLE 3

| | Ca<br>a | BaO<br>b | SiO$_2$<br>c | MgO<br>d | MnO<br>e | VO$_{5/2}$<br>f | YO<br>g$_1$ | Re$_{(2nd)}$O<br>g$_2$ | ReO<br>g |
|---|---|---|---|---|---|---|---|---|---|
| Example 9 | 0.07 | 1.5 | 0.6 | 2.5 | 0.15 | 0.4 | 4.0 | 1.5<br>(note 1) | 5.5 |
| Example 10 | 0.07 | 1.5 | 1.5 | 2.5 | 0.15 | 0.4 | 4.0 | 1.5<br>(note 1) | 5.5 |
| Example 11 | 0.07 | 1.5 | 4.0 | 2.5 | 0.15 | 0.4 | 4.0 | 1.5<br>(note 1) | 5.5 |
| Comparative Example 5 | 0.07 | 1.5 | 0.3 | 2.5 | 0.15 | 0.4 | 4.0 | 1.5<br>(note 1) | 5.5 |
| Comparative Example 6 | 0.07 | 1.5 | 5.5 | 2.5 | 0.15 | 0.4 | 4.0 | 1.5<br>(note 1) | 5.5 |

(note 1)
Re$_{(2nd)}$O = DyO

TABLE 4

| | Ca<br>a | BaO<br>b | SiO$_2$<br>c | MgO<br>d | MnO<br>e | VO$_{5/2}$<br>f | YO<br>g$_1$ | Re$_{(2nd)}$O<br>g$_2$ | ReO<br>g |
|---|---|---|---|---|---|---|---|---|---|
| Example 12 | 0.07 | 1.5 | 2.0 | 1.5 | 0.15 | 0.4 | 4.0 | 1.5<br>(note 1) | 5.5 |
| Example 13 | 0.07 | 1.5 | 2.0 | 2.0 | 0.15 | 0.4 | 4.0 | 1.5<br>(note 1) | 5.5 |
| Example 14 | 0.07 | 1.5 | 2.0 | 3.0 | 0.15 | 0.4 | 4.0 | 1.5<br>(note 1) | 5.5 |
| Comparative Example 7 | 0.07 | 1.5 | 2.0 | 0.8 | 0.15 | 0.4 | 4.0 | 1.5<br>(note 1) | 5.5 |
| Comparative Example 8 | 0.07 | 1.5 | 2.0 | 4.5 | 0.15 | 0.4 | 4.0 | 1.5<br>(note 1) | 5.5 |

(note 1)
Re$_{(2nd)}$O = DyO

TABLE 5

| | Ca<br>a | BaO<br>b | SiO$_2$<br>c | MgO<br>d | MnO<br>e | VO$_{5/2}$<br>f | YO<br>g$_1$ | Re$_{(2nd)}$O<br>g$_2$ | ReO<br>g |
|---|---|---|---|---|---|---|---|---|---|
| Example 15 | 0.07 | 1.5 | 2.0 | 2.5 | 0.10 | 0.4 | 4.0 | 1.5<br>(note 1) | 5.5 |
| Comparative Example 9 | 0.07 | 1.5 | 2.0 | 2.5 | 0.05 | 0.4 | 4.0 | 1.5<br>(note 1) | 5.5 |
| Example 16 | 0.07 | 1.5 | 2.0 | 2.5 | 0.30 | 0.4 | 4.0 | 1.5<br>(note 1) | 5.5 |

(note 1)
Re$_{(2nd)}$O = DyO

TABLE 6

| | Ca<br>a | BaO<br>b | SiO$_2$<br>c | MgO<br>d | MnO<br>e | VO$_{5/2}$<br>f | YO<br>g$_1$ | Re$_{(2nd)}$O<br>g$_2$ | ReO<br>g |
|---|---|---|---|---|---|---|---|---|---|
| Example 17 | 0.07 | 1.5 | 2.0 | 2.5 | 0.15 | 0.3 | 4.0 | 1.5<br>(note 1) | 5.5 |
| Comparative Example 10 | 0.07 | 1.5 | 2.0 | 2.5 | 0.15 | 0.0 | 4.0 | 1.5<br>(note 1) | 5.5 |
| Example 18 | 0.07 | 1.5 | 2.0 | 2.5 | 0.15 | 0.8 | 4.0 | 1.5<br>(note 1) | 5.5 |

(note 1)
Re$_{(2nd)}$O = DyO

TABLE 7

| | Ca a | BaO b | SiO$_2$ c | MgO d | MnO e | VO$_{5/2}$ f | YO g$_1$ | Re $_{(2nd)}$ O g$_2$ | ReO g |
|---|---|---|---|---|---|---|---|---|---|
| Example 19 | 0.07 | 1.5 | 2.0 | 2.5 | 0.15 | 0.4 | 5.2 | 0 | 5.2 |
| Example 20 | 0.07 | 1.5 | 2.0 | 2.5 | 0.15 | 0.4 | 4.2 | 1.0 (note 1) | 5.2 |
| Example 21 | 0.07 | 1.5 | 2.0 | 2.5 | 0.15 | 0.4 | 5.0 | 0.5 (note 1) | 5.5 |
| Example 22 | 0.07 | 1.5 | 2.0 | 2.5 | 0.15 | 0.4 | 4.0 | 2.0 (note 1) | 6.0 |
| Example 23 | 0.07 | 1.5 | 2.0 | 2.5 | 0.15 | 0.4 | 4.5 | 1.5 (note 1) | 6.0 |
| Example 24 | 0.07 | 1.5 | 2.0 | 2.5 | 0.15 | 0.4 | 5.0 | 1.0 (note 1) | 6.0 |
| Example 25 | 0.07 | 1.5 | 2.0 | 2.5 | 0.15 | 0.4 | 5.0 | 1.5 (note 1) | 6.5 |
| Example 26 | 0.07 | 1.5 | 2.0 | 2.5 | 0.15 | 0.4 | 5.0 | 2.0 (note 1) | 7.0 |
| Example 27 | 0.07 | 1.5 | 2.0 | 2.5 | 0.15 | 0.4 | 4.0 | 1.5 (note 2) | 5.5 |
| Example 28 | 0.07 | 1.5 | 2.0 | 2.5 | 0.15 | 0.4 | 4.0 | 1.5 (note 3) | 5.5 |
| Example 29 | 0.07 | 1.5 | 2.0 | 2.5 | 0.15 | 0.4 | 4.0 | 1.5 (note 4) | 5.5 |
| Comparative Example 11 | 0.07 | 1.5 | 2.0 | 2.5 | 0.15 | 0.4 | 6.0 | 1.3 (note 1) | 7.3 |
| Example 30 | 0.07 | 1.5 | 2.0 | 2.5 | 0.15 | 0.4 | 4.0 | 1.5 (note 5) | 5.5 |

(note 1)
Re $_{(2nd)}$ O = DyO
(note 2)
Re $_{(2nd)}$ O = YbO
(note 3)
Re $_{(2nd)}$ O = HoO
(note 4)
Re $_{(2nd)}$ O = GdO
(note 5)
Re $_{(2nd)}$ O = DyO 1.49 mol + CrO 0.01 mol A solvent and a dispersant were added to the raw material powder combined with a predetermined composition. As the solvent, a mixed solvent of ethanol/toluene (60/40 mass ratio) was used. In addition, the amount of the solvent was adjusted so that a solid content was 40% by mass. As the dispersant, a phosphate ester dispersant (BYK-103, manufactured by Big Chemical Japan Corporation) was used. The dispersant was added in an amount of 1% by mass with respect to a total mass of barium calcium titanate, SiO$_2$, BaCO$_3$, Mn$_3$O$_4$, and V$_2$O$_5$.

Next, wet mixing by a rotary ball mill was performed at 25° C. for 14 hours using a 3 mmφ ZrO$_2$ ball. Thereafter, a binder solution was additionally added. PVB (product of Sekisui Chemical Co., Ltd., BH-3) was used as the binder. As the solvent contained in the solution, a mixed solvent of ethanol/toluene (60/40 mass ratio) was used. In addition, when preparing the solution, the amount of the solvent was adjusted so that the PVB solid content was 15% by mass. The binder solution was added so that the sum of PVB/each raw material=10/90 mass ratio.

Next, dioctyl phthalate (DOP) was added. The added amount of DOP was 30% by mass with respect to the binder (PVB). Thereafter, ceramic slurry was obtained by mixing at 25° C. for 4 hours using a rotary ball mill.

Next, a green sheet was manufactured from the obtained slurry. Specifically, the slurry was dropped on a PET film and shaped into a sheet using a die coater to obtain a green sheet. A thickness of the obtained green sheet was about 4 μm or more and 6 μm or less. Thereafter, a conductive paste containing Ni was screen printed on the green sheet. Accordingly, a Ni conductive paste film was formed on the green sheet.

Thereafter, a plurality of formed green sheets were stacked. Specifically, the green sheets were alternately stacked so that the Ni conductive paste regions formed counter electrodes. Thereafter, the green sheets were heat-pressed and cut into predetermined dimensions to obtain a green chip of a condenser body. Meanwhile, the conditions of heat pressing were that pressing temperature was 80° C., pressing pressure was 50 MPa, and a pressing time was 3 minutes.

Thereafter, the manufactured chip was heat treated. Specifically, the chip was heat-treated under conditions that the chip was maintained at 350° C. for 3 hours at a heating rate of 12° C./h. Meanwhile, the chip was heated in a reducing atmosphere of N$_2$ gas (2 L/min). Moreover, the binder contained in the chip was burned by the heat treatment.

Next, the green chip (degreasing-finished chip) was fired. Sintering conditions were a temperature of 1200° C. or higher and 1300° C. or lower and a N$_2$ and H$_2$ mixture gas atmosphere. Meanwhile, during sintering, a partial pressure of oxygen was adjusted to a reducing atmosphere of about 10$^{-8}$ atom or more and 10$^{-9}$ atom or less. In addition, a top temperature keep time of sintering was 1 hour. A capacitor body was obtained by the above method.

Next, a Cu paste including a glass frit was applied to both ends of the condenser body. Thereafter, the Cu paste was baked at 800° C. in an N$_2$ atmosphere. Accordingly, a multilayer ceramic capacitor having the external electrode electrically connected to the internal electrode for testing was manufactured.

An external dimension of the multilayer ceramic capacitor is 4.0 mm in length. In addition, a width of the capacitor is 2.0 mm, and a thickness is 0.5 mm. Further, a thickness of a dielectric ceramic layer interposed between the internal electrodes is about 3.8 μm. Further, the dielectric ceramic layer has 19 layers, and an effective electrode area per layer is 2.55 mm$^2$.

[Evaluation]

The dielectric materials obtained in the Examples, Comparative Examples, and Reference Examples were evaluated as follows.

(1) XRD Measurement

A crystal structure of each dielectric material was identified by XRD measurement. At the time of measurement, an X-ray diffraction device was used. The X-ray diffraction device in use was manufactured by PANalytical. Meanwhile, measurement conditions were that a source: Cu-Kα, a voltage: 45 kV, and a current: 40 mA. As a result of the measurement, it was confirmed that each fired dielectric material had a tetragonal crystal and a space group (P4 mm), which are crystal structures of the main component of calcium barium titanate.

(2) Relative Dielectric Constant

For measurement of the relative dielectric constant, an LCR meter was used. The LCR meter in use was 4284A manufactured by Agilent. Meanwhile, measurement conditions at the time of measurement were AC electric field strength: 0.35 V/μm and frequency: 1 kHz. The obtained values are as shown in Tables 8 to 14, respectively.

(3) Capacity Temperature Characteristic

The capacity temperature characteristic is a measurement value of capacitance of the dielectric material in a temperature range from −55° C. to 200° C. In measuring the capacitance, a digital LCR meter was used. The digital LCR meter in use was 4284A manufactured by Japan Hewlett-Packard Co., Ltd. Measurement conditions were that frequency: 1 kHz and input signal level: 1 Vrms.

From the measurement of the capacitance, a change rate of the capacitance (unit: %) at each temperature with respect to the capacitance at 25° C. was calculated according to the following equation. Also, a capacity temperature change rate (ΔC) at each temperature was evaluated from the corresponding change rate. Meanwhile, capacity temperature characteristics were evaluated as shown below.

(3a) X8R Characteristics (IEA Standard)
○: Capacity temperature change rate ΔC at −55° C. to 150° C. is within ±15%.
x: ΔC is outside the range of ±15%.

(3b) X9M Characteristics (IEA Standard)
○: Capacity temperature change rate ΔC at −55° C. to 200° C. is within −50% to +15%.
x: ΔC is outside a range of −50% or more and within +15%.

Capacity temperature change rate(ΔC)=[{(capacitance at target temperature)−(capacitance at 25° C.)}/(capacitance at 25° C.)]×100(%) [Equation 2]

(4) Insulation Resistivity

For the measurement of insulation resistance, a high insulation resistance meter was used. The insulation resistance meter in use was 4339B manufactured by Agilent. Meanwhile, the insulation resistance was measured under the condition of DC electric field strength of 10 V/μm at room temperature. Obtained values are as shown in Tables 8 to 14, respectively.

(5) High Temperature Load Reliability Test

For the high temperature load reliability test, 100 stacked chips manufactured above were prepared. Next, a voltage was applied to the stacked chips so that an electric field strength was 20 V/μm at a temperature of 200° C. In this way, reliability evaluation was conducted by the high temperature load reliability test. Meanwhile, a failure was determined by measuring deterioration of insulation resistance of each chip over time. Specifically, it is determined as a failure at the time when the following (5a) or (5b) is reached.

(5a) when a Leakage Current of 10 mA or More Flows Through the Chip (5b) when an Insulation Resistance Value of a Sample is 1.0E+05Ω or Less A time to failure was statistically processed through Weibull analysis. Accordingly, mean time to failure (MTTF) was calculated.

Tables 8 to 14 show Examples which are the basis of the composition ranges described in claims and Comparative Examples. Sinterability was evaluated by sintering samples under a reducing atmosphere (oxygen partial pressure 10$^{-8}$ atom or more and 10$^{-9}$ atom or less). Meanwhile, sinterability was evaluated by heating the samples in a temperature range of 1200° C. to 1300° C. In tables, "Insufficient sintering" refers to that electrical properties cannot be evaluated due to poor sintering due to insufficient sintering density.

TABLE 8

| | ε | DF | Insulation resistance | 150° C. TC | 200° C. TC | X8R | X9M | MTTF |
|---|---|---|---|---|---|---|---|---|
| | — | % | Ω · cm | % | % | — | — | hr |
| Example 1 | 2430 | 4.21 | 1.70E+13 | −14.9 | −47.1 | ○ | ○ | 19.9 |
| Example 2 | 2410 | 4.46 | 1.62E+13 | −13.3 | −45.5 | ○ | ○ | 41.4 |
| Example 3 | 2010 | 5.92 | 1.69E+13 | −8.9 | −45.0 | ○ | ○ | 29.9 |
| Example 4 | 2150 | 6.53 | 1.18E+13 | −8.9 | −45.0 | ○ | ○ | 7.2 |
| Example 5 | 2080 | 6.38 | 1.26E+13 | −10.6 | −46.0 | ○ | ○ | 19.6 |
| Example 6 | 2120 | 6.23 | 1.15E+13 | −8.2 | −44.0 | ○ | ○ | 12.6 |
| Example 7 | 1790 | 7.13 | 1.76E+13 | −6.1 | −38.8 | ○ | ○ | 5.3 |
| Comparative Example 1 | 2490 | 3.33 | 1.68E+13 | −19.1 | −51.1 | x | ○ | 1.1 |
| Comparative Example 2 | 1680 | 7.28 | 1.56E+13 | −5.5 | −37.7 | ○ | ○ | 5.5 |

It can be seen from Table 8 that both X9M and MTTF are achieved by satisfying 0.05<a<0.15. FIG. 1 is a view showing a TCC curve of the dielectric material produced in Example 2. The dielectric material of Example 2 is stable in electrical capacity up to 130° C. In addition, an electric capacity of the dielectric material decreases when it exceeds 130° C. However, the degree of reduction in the electric capacity is small to satisfy both the X8R requirement and the X9M requirement. Comparative Example 2 satisfies the temperature characteristics (X9M and X8R) of the electric capacity. However, Comparative Example 2 has a low dielectric constant of ε<1700. Therefore, even if the multilayer capacitor is a multilayer structure, it is difficult to secure electric capacity.

TABLE 9

|  | ε — | DF % | Insulation resistance Ω · cm | 150° C. TC % | 200° C. TC % | X8R — | X9M — | MTTF hr |
|---|---|---|---|---|---|---|---|---|
| Example 8 | 2290 | 4.44 | 1.58E+13 | −14.0 | −45.8 | ○ | ○ | 21.3 |
| Comparative Example 3 | | | | Insufficient sintering | | | | |
| Comparative Example 4 | 2390 | 4.66 | 1.18E+13 | −16.3 | −48.8 | x | ○ | <1.0 |

TABLE 10

|  | ε — | DF % | Insulation resistance Ω · cm | 150° C. TC % | 200° C. TC % | X8R — | X9M — | MTTF hr |
|---|---|---|---|---|---|---|---|---|
| Example 9 | 2030 | 4.01 | 1.13E+13 | −16.1 | −46.0 | x | ○ | 4.2 |
| Example 10 | 2220 | 4.26 | 1.11E+13 | −13.1 | −44.9 | ○ | ○ | 19.7 |
| Example 11 | 2680 | 4.46 | 1.11E+13 | −14.9 | −45.4 | ○ | ○ | 3.8 |
| Comparative Example 5 | | | | Insufficient sintering | | | | |
| Comparative Example 6 | 2860 | 4.61 | 8.80E+12 | −17.9 | −48.4 | x | ○ | <1.0 |

TABLE 11

|  | ε — | DF % | Insulation resistance Ω · cm | 150° C. TC % | 200° C. TC % | X8R — | X9M — | MTTF hr |
|---|---|---|---|---|---|---|---|---|
| Example 12 | 2230 | 4.45 | 1.39E+13 | −14.5 | −48.5 | ○ | ○ | 15.8 |
| Example 13 | 2250 | 4.44 | 1.60E+13 | −14.1 | −48.2 | ○ | ○ | 22.6 |
| Example 14 | 2180 | 4.46 | 1.50E+13 | −14.9 | −48.6 | ○ | ○ | 8.9 |
| Comparative Example 7 | 2240 | 4.40 | 1.22E+13 | −14.3 | −47.8 | ○ | ○ | <1.0 |
| Comparative Example 8 | | | | Insufficient sintering | | | | |

TABLE 12

|  | ε — | DF % | Insulation resistance Ω · cm | 150° C. TC % | 200° C. TC % | X8R — | X9M — | MTTF hr |
|---|---|---|---|---|---|---|---|---|
| Example 15 | 2190 | 4.38 | 1.33E+13 | −14.0 | −45.8 | ○ | ○ | 6.4 |
| Comparative Example 9 | | | | Insufficient sintering | | | | |
| Example 16 | 1910 | 4.65 | 1.10E+13 | −15.3 | −48.0 | x | ○ | 15.4 |

TABLE 13

|  | ε | DF % | Insulation resistance Ω · cm | 150° C. TC % | 200° C. TC % | X8R | X9M | MTTF hr |
|---|---|---|---|---|---|---|---|---|
| Example 17 | 2310 | 4.44 | 1.25E+13 | −14.9 | −47.1 | ○ | ○ | 22.3 |
| Comparative Example 10 |  |  |  | Insufficient sintering |  |  |  |  |
| Example 18 | 2280 | 4.21 | 1.41E+13 | −17.3 | −48.8 | x | ○ | 3.2 |

From Tables 9 to 13, the following effects are exhibited by appropriately controlling the range of b to f. That is, sintering may be performed in a relatively low temperature range of 1300° C. or lower. In addition, compatibility of X9M and MTTF is also promoted.

TABLE 14

|  | ε | DF % | Insulation resistance Ω · cm | 150° C. TC % | 200° C. TC % | X8R | X9M | MTTF hr |
|---|---|---|---|---|---|---|---|---|
| Example 19 | 2560 | 4.40 | 1.55E+13 | −16.5 | −47.2 | x | ○ | 5.0 |
| Example 20 | 2480 | 4.45 | 1.61E+13 | −15.2 | −46.3 | x | ○ | 29.3 |
| Example 21 | 2400 | 4.52 | 1.57E+13 | −15.7 | −46.5 | x | ○ | 15.4 |
| Example 22 | 1850 | 4.25 | 1.58E+13 | −12.5 | −44.0 | ○ | ○ | 12.2 |
| Example 23 | 2150 | 4.38 | 1.30E+13 | −13.4 | −45.1 | ○ | ○ | 26.7 |
| Example 24 | 2010 | 4.44 | 1.67E+13 | −15.3 | −46.5 | x | ○ | 26.0 |
| Example 25 | 1910 | 4.51 | 1.58E+13 | −13.8 | −44.9 | ○ | ○ | 22.0 |
| Example 26 | 1790 | 4.48 | 1.41E+13 | −13.1 | −44.8 | ○ | ○ | 8.8 |
| Example 27 | 2100 | 4.52 | 1.14E+13 | −11.0 | −43.5 | ○ | ○ | 13.9 |
| Example 28 | 2160 | 4.40 | 1.68E+13 | −12.3 | −44.0 | ○ | ○ | 22.6 |
| Example 29 | 2280 | 4.00 | 1.58E+13 | −17.2 | −48.9 | x | ○ | 20.1 |
| Comparative Example 11 | 1660 | 4.50 | 1.52E+13 | −14.2 | −45.1 | ○ | ○ | 3.0 |
| Example 30 | 2650 | 4.45 | 5.79E+13 | −15.6 | −45.9 | x | ○ | 4.0 |

From Table 14, the following effects are exhibited when YO is obtained and $5.0 < g \leq 7.0$ is satisfied. In other words, compatibility of X9M and MTTF is promoted.

As set forth above, according to exemplary embodiments of the present disclosure, a dielectric material including x molar parts of Ba, c molar parts of Si, d molar parts of Mg, e molar parts of Mn, f molar parts of V, and g molar parts of Re (Re contains at least Y), in which $x=100(1-a)+b$, $0.05<a<0.15$, $1.0<b<2.5$, $0.5<c<5.0$, $1.0<d<4.0$, $0.01<e<1.0$, $0.01<f<3.0$, and $5.0<g\leq7.0$, is provided.

While exemplary embodiments have been shown and described above, it will be apparent to those skilled in the art that modifications and variations could be made without departing from the scope of the present disclosure as defined by the appended claims.

What is claimed is:

1. A dielectric material comprising:
   x molar parts of Ba, c molar parts of Si, d molar parts of Mg, e molar parts of Mn, f molar parts of V, and g molar parts of rare earth element Re (Re contains at least Y), wherein $x=100(1-a)+b$, $0.05<a<0.15$, $1.0<b<2.5$, $0.5<c<5.0$, $1.0<d<4.0$, $0.01<e<1.0$, $0.01<f<3.0$, and $5.0<g\leq7.0$,
   wherein the dielectric material further comprises 100*a molar parts of Ca.

2. The dielectric material of claim 1, wherein
   Re further includes one or more elements selected from rare earth elements other than Y.

3. The dielectric material of claim 2, wherein
   Re includes g1 molar parts of Y and g2 molar parts of one or more elements selected from among the rare earth elements other than Y, and $g=g1+g2$, $g1\geq4$, and $g2\geq1$ are additionally satisfied.

4. The dielectric material of claim 3, wherein
   the one or more elements selected from among the rare earth elements other than Y are Dy.

5. The dielectric material of claim 1, wherein
   $1.5<c<5.0$ is satisfied.

6. The dielectric material of claim 1, wherein
   $0.05<e<0.25$ is satisfied.

7. The dielectric material of claim 1, wherein
   $0.05<f<0.7$ is satisfied.

8. The dielectric material of claim 1, further comprising a Ti component, wherein
   Cr is included within a range of greater than 0 mole and less than 0.01 moles with respect to 100 moles of Ti.

9. A multilayer ceramic capacitor comprising the dielectric material described in claim 1.

10. A dielectric material comprising:
    81.132 at% to 93.732 at% of Ba, 0.442 at% to 5.154 at% of Si, 0.873 at% to 4.188 at% of Mg, 0.009 at% to 1.069 at% of Mn, 0.009 at% to 3.141 at% of V, and 4.329 at% to 7.406 at% of rare earth element Re, where Re includes at least Y,
    wherein the dielectric material further comprises 100*a molar parts of Ca.

11. A multilayer ceramic capacitor comprising the dielectric material described in claim 10.

12. A dielectric material comprising:
    x molar parts of Ba, 100*a molar parts of Ca, c molar parts of Si, d molar parts of Mg, e molar parts of Mn, f molar parts of V, and g molar parts of rare earth element Re (Re contains at least Y), wherein $x=100(1-a)+b$, $0.05<a<0.15$, $1.0<b<2.5$, $0.5<c<5.0$, $1.0<d<4.0$, $e>0.01$, $f>0.01$, and $5.0<g\leq7.0$.

13. The dielectric material of claim 12, wherein Re further includes one or more elements selected from among Y and the rare earth elements other than Y.

14. The dielectric material of claim 13, wherein Re includes g1 molar parts of Y and g2 molar parts of one or more elements selected from among the rare earth elements other than Y, and $g=g1+g2$, $g1 \geq 4$, and $g2 \geq 1$ are additionally satisfied.

15. The dielectric material of claim 14, wherein the one or more elements selected from among the rare earth elements other than Y are Dy.

16. The dielectric material of claim 12, further comprising a Ti component, wherein Cr is included within a range of greater than 0 mole and less than 0.01 moles with respect to 100 moles of Ti.

17. A multilayer ceramic capacitor comprising the dielectric material described in claim 12.

\* \* \* \* \*